(12) United States Patent
Bhatia et al.

(10) Patent No.: US 7,716,408 B2
(45) Date of Patent: May 11, 2010

(54) BURN RACK DOCKING APPARATUS FOR AN INFORMATION HANDLING SYSTEM

(75) Inventors: Amit Pradip Bhatia, Hermitage, TN (US); Scott Joseph Boyd, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 414 days.

(21) Appl. No.: 11/751,904

(22) Filed: May 22, 2007

(65) Prior Publication Data

US 2008/0294830 A1 Nov. 27, 2008

(51) Int. Cl.
*G06F 13/00* (2006.01)

(52) U.S. Cl. .................. 710/304; 710/306; 710/62; 710/72

(58) Field of Classification Search ......... 710/300–315, 710/62–64, 72; 713/340
See application file for complete search history.

(56) References Cited

U.S. PATENT DOCUMENTS

| | | | |
|---|---|---|---|
| 4,542,341 A | 9/1985 | Santomango et al. | |
| 5,397,998 A | 3/1995 | Soeno et al. | |
| 6,144,976 A * | 11/2000 | Silva et al. | 708/100 |
| 6,160,411 A | 12/2000 | Eliashberg et al. | |
| 6,169,413 B1 | 1/2001 | Paek et al. | |
| 6,282,594 B1 * | 8/2001 | McTague et al. | 710/301 |
| 6,398,569 B1 | 6/2002 | Boyd et al. | |
| 6,499,115 B1 * | 12/2002 | Wiedeman et al. | 714/30 |
| 6,598,223 B1 * | 7/2003 | Vrhel et al. | 717/174 |
| 6,741,463 B1 * | 5/2004 | Akhtar et al. | 361/679.41 |
| 6,806,700 B2 | 10/2004 | Wanek et al. | |
| 7,085,132 B2 * | 8/2006 | Schlesener et al. | 361/679.23 |
| 7,095,908 B2 * | 8/2006 | Jarvis et al. | 382/305 |
| 2004/0224539 A1 | 11/2004 | Boyd et al. | |
| 2005/0083651 A1 * | 4/2005 | Smith et al. | 361/687 |

OTHER PUBLICATIONS

Scott J. Boyd, John Morrison, Method And Apparatus For Coupling A Cable To A Socket, U.S. Appl. No. 11/438,206, filed on May 22, 2006.

* cited by examiner

*Primary Examiner*—Raymond N Phan
(74) *Attorney, Agent, or Firm*—Haynes and Boone, LLP

(57) ABSTRACT

A first docking interface includes a substrate. A first power receiver is formed in the substrate. The first power receiver is operable to be automatically docked to a power provider, such as a burn rack, and to receive power from the power provider. A first power transmitter formed in the substrate and coupled to the first power receiver. The first power transmitter is operable to receive power from the first power receiver and transmit power to an information handling system (IHS).

7 Claims, 10 Drawing Sheets

BURN RACK DOCKING APPARATUS FOR AN INFORMATION HANDLING SYSTEM

BACKGROUND

The present disclosure relates generally to information handling systems, and more particularly to docking an information handling system in a burn rack.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be generally configured or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Conventionally during the process of manufacturing an IHS, components are manually put into the chassis to form an IHS. The IHS is then sent in the tray to a burn rack. Once the IHS arrives at the burn rack, it must wait to be manually docked before the burning process can commence. Typically, manual docking includes a person connecting the IHS to a power source and a network source so that the IHS can be tested and software can be downloaded. Waiting for a person to manually dock the IHS can slow down the manufacturing process and be workforce intensive.

Accordingly, it would be desirable to provide for improved docking of an IHS in a burn rack.

SUMMARY

According to one embodiment, a first docking interface includes a substrate. A first power receiver is formed in the substrate, wherein the first power receiver is operable to be automatically docked to a power provider and receive power from the power provider. A first power transmitter is formed in the substrate and coupled to the first power receiver, wherein the first power transmitter is operable to receive power from the first power receiver and transmit power to an information handling system (IHS).

BRIEF DESCRIPTION OF THE DRAWINGS

FIG. 1b is a perspective view of an embodiment of the IHS of FIG. 1a.

FIG. 2b is a perspective view illustrating an embodiment of the connector interface of FIG. 2a.

FIG. 3b is a top view illustrating an embodiment of the tray of FIG. 3a.

DETAILED DESCRIPTION

For purposes of this disclosure, an information handling system (IHS) may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1A:
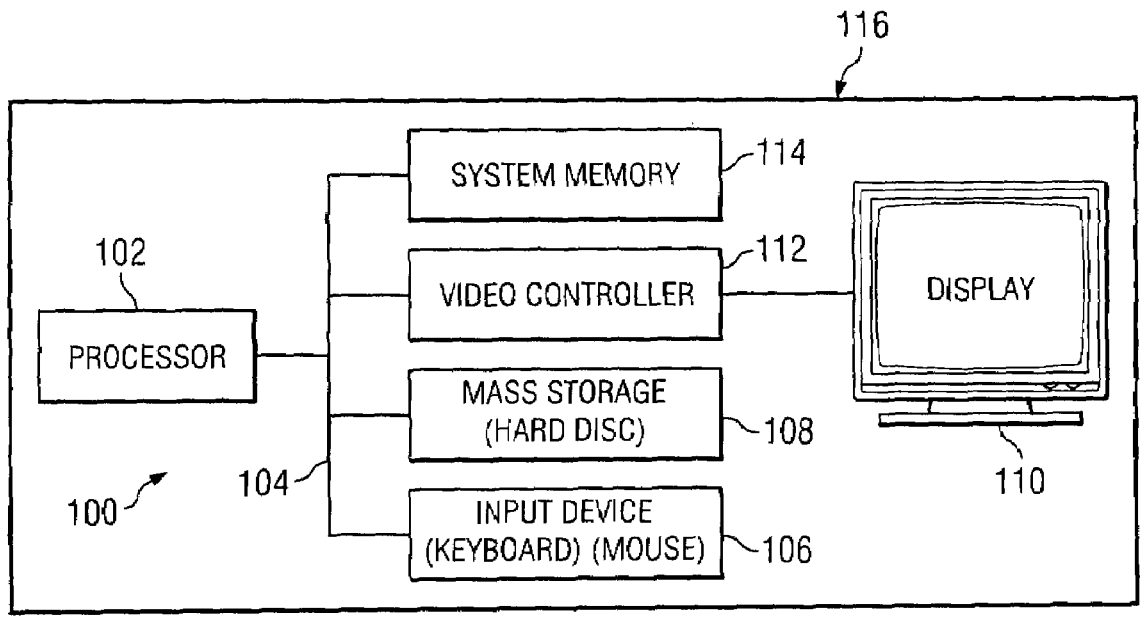
FIG. 1a is a schematic view illustrating an embodiment of an information handling system (IHS).

In one embodiment, IHS 100, FIG. 1a, includes a processor 102, which is connected to a bus 104. Bus 104 serves as a connection between processor 102 and other components of computer system 100. An input device 106 is coupled to processor 102 to provide input to processor 102. Examples of input devices include keyboards, touchscreens, and pointing devices such as mouses, trackballs and trackpads. Programs and data are stored on a mass storage device 108, which is coupled to processor 102. Mass storage devices include such devices as hard disks, optical disks, magneto-optical drives, floppy drives and the like. IHS system 100 further includes a display 110, which is coupled to processor 102 by a video controller 112. A system memory 114 is coupled to processor 102 to provide the processor with fast storage to facilitate execution of computer programs by processor 102. In an embodiment, a chassis 116 houses some or all of the components of IHS 100. It should be understood that other buses and intermediate circuits can be deployed between the components described above and processor 102 to facilitate interconnection between the components and the processor 102.

Figure 1B:
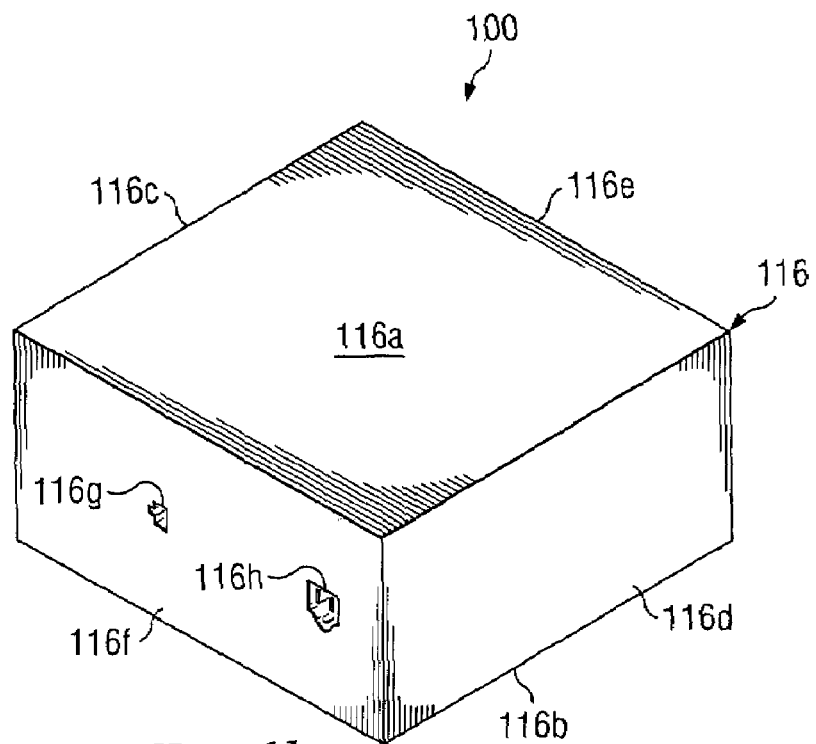

Referring now to FIG. 1b, a perspective view of an embodiment of the IHS 100 is shown. The IHS 100 includes a chassis 116 having a top surface 116a, a bottom surface 116b opposite the top surface 116a, four side edges 116c, 116d, 116e and 116f, extending between the top surface 116a and the bottom surface 116b, a data port 116g located on the side edge 116f and coupled to the processor 102, and a power port 116h located on the side edge 116f and coupled to the processor 102.

Figure 2A:
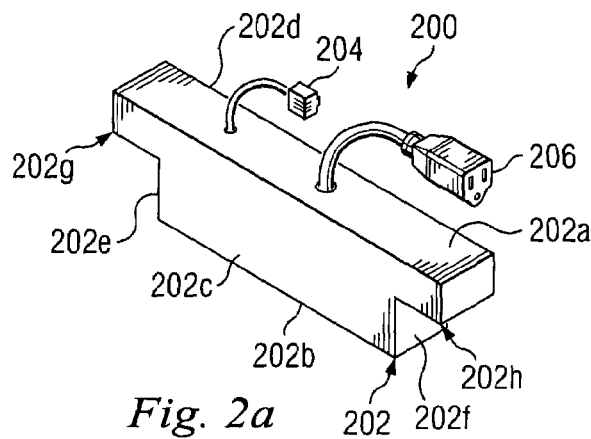
FIG. 2a is a perspective view illustrating an embodiment of a connector interface.
Figure 2B:
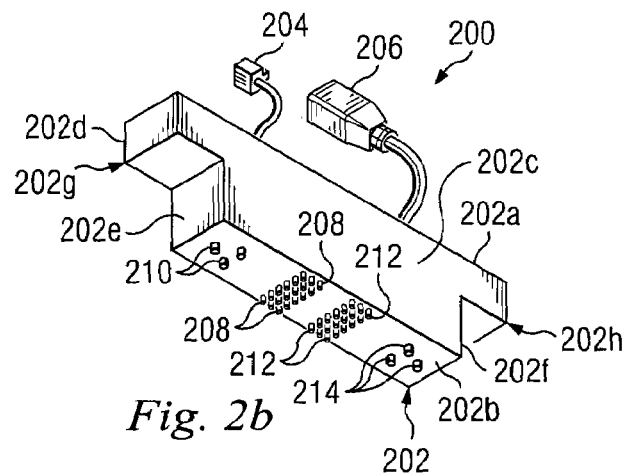

Referring now to FIGS. 2a and 2b, an embodiment of a connector interface 200 is illustrated. In an embodiment, the connector interface 200 includes a substrate 202 having a top surface 202a, a bottom surface 202b located opposite the top surface 202a, a front surface 202c extending between the top surface 202a and the bottom surface 202b, a rear surface 202d located opposite the front surface 202c and extending between the top surface 202a and the bottom surface 202b, a pair of opposing side edges 202e and 202f extending between the front surface 202c and the rear surface 202d, a first tray coupling member 202g extends from the side edge 202e adjacent the top surface 202a, and a second tray coupling member 202h extends from the side edge 202f adjacent the top surface 202a.

In an embodiment, a network cable 204 and a power cable 206 extend from the top surface 202a of the substrate 202. In an embodiment, a first plurality of network pins 208 extend from the bottom surface 202b of the substrate 202 and is electrically coupled to the network cable 204. In an embodiment, the first plurality of network pins 208 are spring loaded. In an embodiment, a first plurality of power contact pins 210 extend from the bottom surface 202b of the substrate 202 and is electrically coupled to the power cable 206. In an embodiment, the first plurality of power contact pins 210 are spring loaded. In an embodiment, additional cables and additional contact pins extend from the substrate 202. In an embodiment, the first plurality of network contact pins 208 and the first plurality of power contact pins 210 are replaced with a first plurality of network contact surfaces and a first plurality of power contact surfaces, respectively. In an embodiment, the first plurality of network contact pins 208 are duplicated substantially symmetrically with a second plurality of network contact pins 212 that extend from the bottom surface 202b of the substrate 202 and are electrically coupled to the network cable 204. In an embodiment, the first plurality of power contact pins 210 are duplicated substantially symmetrically with a second plurality of power contact pins 214 that extend from the bottom surface 202b of the substrate 202 and are electrically coupled to the network cable 204. In an embodiment, the connector interface 200 only includes the first plurality of network pins 208 and does not include the second plurality of network contact pins 212. In an embodiment, the connector interface 200 only includes the first plurality of power contact pins 210 and does not include the second plurality of power contact pins 214. In an embodiment, the connector interface 200 includes one or more additional cables electrically coupled to one or more additional pluralities of contact pins or contact surfaces to transmit additional data and/or additional power.

Figure 3A:
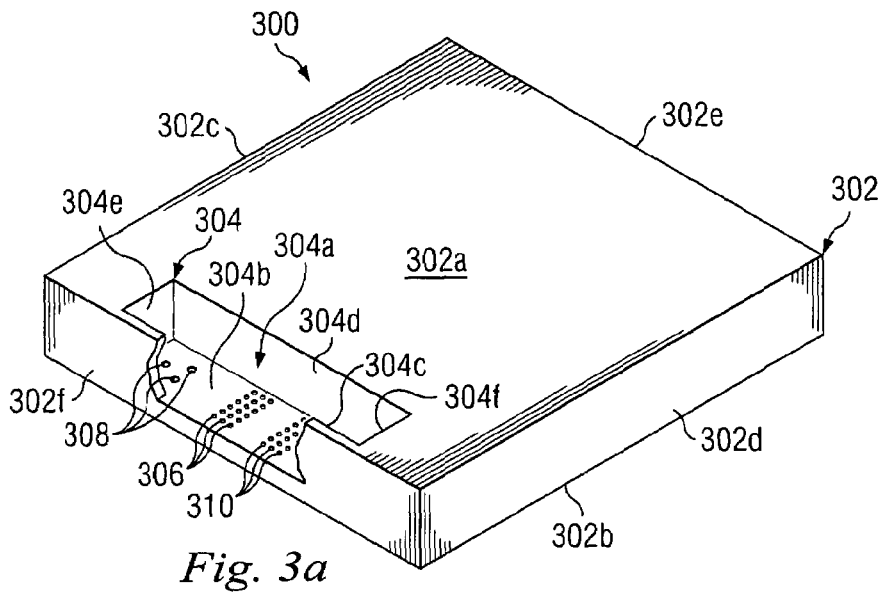
FIG. 3a is a perspective view illustrating an embodiment of a tray.
Figure 3B:
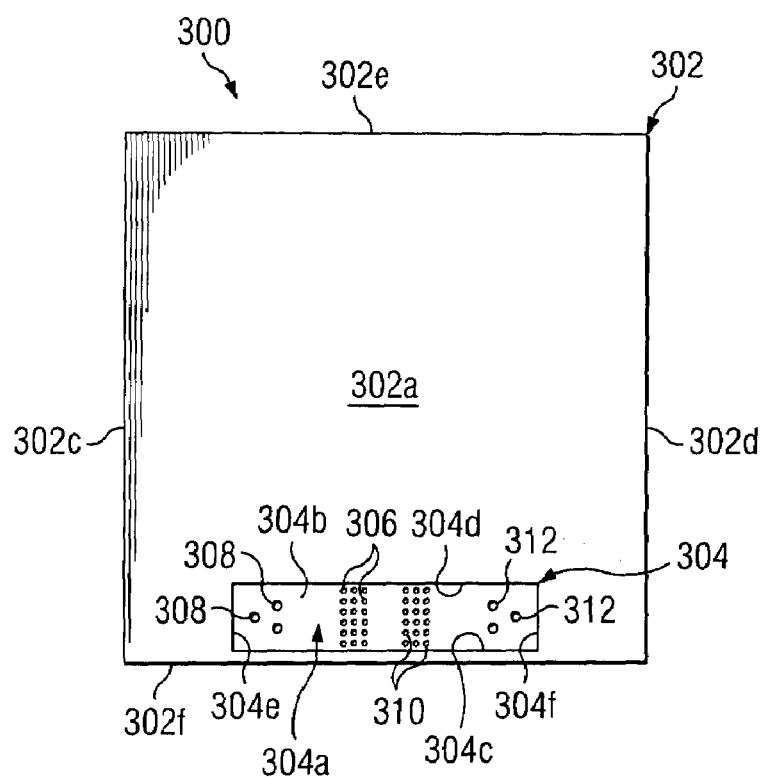
Figure 3C:
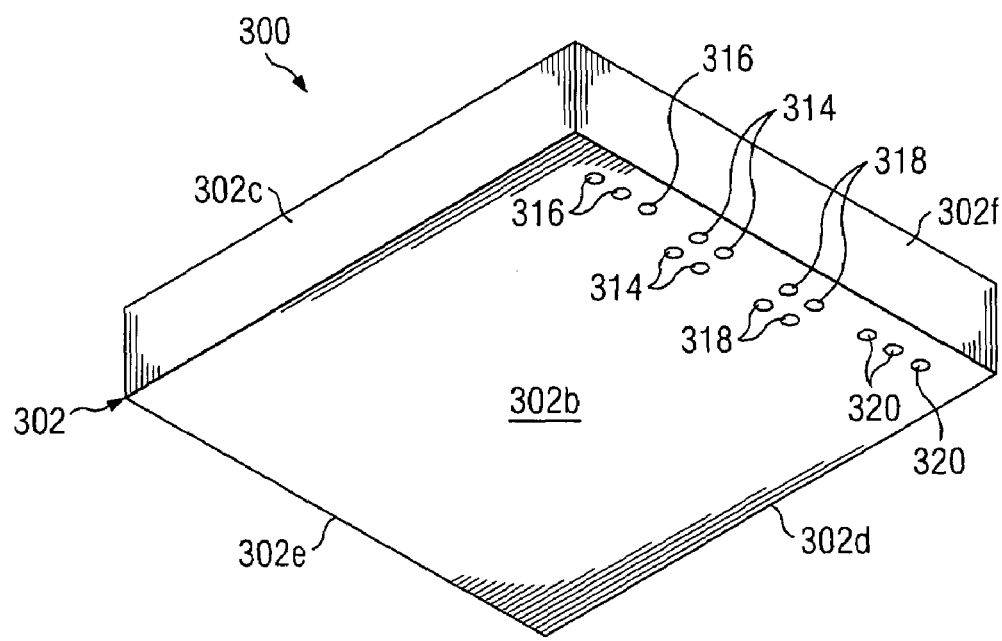
FIG. 3c is a perspective view illustrating an embodiment of the tray of FIGS. 3a and 3b.

Referring now to FIGS. 3a, 3b and 3c, an embodiment of a tray 300 is illustrated. In an embodiment, the tray 300 includes a substrate 302 having a top surface 302a, a bottom surface 302b opposite the top surface 302a, and four side edges 302c, 302d, 302e and 302f, extending between the top surface 302a and the bottom surface 302b. In an embodiment, a channel 304 is defined by the substrate 302 and extends into the substrate 302 from a channel entrance 304a located on the top surface 302a of the substrate 302. In an embodiment, the channel 304 is defined by a channel bottom surface 304b located opposite the channel entrance 304a, and four channel side edges 304c, 304d, 304e and 304f, extending between the channel entrance 304a and the channel bottom surface 304b. In the illustrated embodiment the cable channel 304 is defined by the substrate 302, but in another embodiment the channel 304 may be defined by the substrate 302 and a removable insert placed inside of an opening defined by the substrate 302.

Referring again to the bottom surface 304b of the channel 304, in an embodiment a printed circuit board including a first plurality of network contacts 306 and a first plurality of power contacts 308 is located on the bottom surface 304b. In an embodiment, a second plurality of network contacts 310 and a second plurality of power contacts 312 are located on the printed circuit board on the bottom surface 304b of the channel 304 in a substantially symmetrical manner with respect to the first plurality of network contacts 306 and the first plurality of power contacts 308. In an embodiment, a third plurality of network contacts 314 are located on the bottom surface 302b of the substrate 302 and are electrically coupled to the first plurality of network contacts 306. In an embodiment, a third plurality of power contacts 316 are located on the bottom surface 302b of the substrate 302 and are electrically coupled to the first plurality of power contacts 308. In an embodiment, the third plurality of network contacts 314 are duplicated substantially symmetrically in an a fourth plurality of network contacts 318 that are electrically coupled to the second plurality of network contacts 310. In an embodiment, the third plurality of power contacts 316 are duplicated substantially symmetrically in a fourth plurality of power contacts 320 that are electrically coupled to the second plurality of power contacts 312. In the illustrated embodiment the first plurality of network contacts 306, the first plurality of power contacts 308, the second plurality of network contacts 310, the second plurality of power contacts 312, the third plurality of network contacts 314, the third plurality of power contacts 316, the fourth plurality of network contacts 318 and/or the fourth plurality of power contacts 320, are contact surfaces. In an embodiment, the first plurality of network contacts 306, the first plurality of power contacts 308, the second plurality of network contacts 310, the second plurality of power contacts 312, the third plurality of network contacts 314, the third plurality of power contacts 316, the fourth plurality of network contacts 318 and/or the fourth plurality of power contacts 320, are contact pins. In an embodiment, the first plurality of network contacts 306, the first plurality of power contacts 308, the second plurality of network contacts 310, the second plurality of power contacts 312, the third plurality of network contacts 314, the third plurality of power contacts 316, the fourth plurality of network contacts 318 and/or the fourth plurality of power contacts 320, are spring loaded contact pins. In an embodiment, the tray 300 only includes the first plurality of network contacts 306 and the third plurality of network contacts 314 and does not include the second plurality of network contacts 310 or the fourth plurality of network contacts 318. In an embodiment, the tray 300 only includes the first plurality of power contacts 308 and the third plurality of power contacts 316 and does not include the second plurality of power contacts 312 or the fourth plurality of power contacts 320. In an embodiment, the tray 300 includes one or more pluralities of additional contact pins electrically coupled to one or more pluralities of additional contact surfaces to transmit additional data and/or additional power.

Referring now to FIG. 4a, an embodiment of a docking interface 400 illustrated. In an embodiment, the docking interface 400 includes a substrate 402 having a top surface 402a, a bottom surface 402b opposite the top surface 402a, four side edges 402c, 402d, 402e and 402f, extending between the top surface 402a and the bottom surface 402b, a first plurality of network contact pins 402i extend from the top surface 402a, and a first plurality of power contact pins 402j extend from the top surface 402a. In an embodiment, a second plurality of network contact pins 402k extend from the top surface 402a, and a second plurality of power contact pins 402l extend from the top surface 402a in a substantially symmetrical manner with respect to the first plurality of network contact pins 402i and the first plurality of power contact pins 402j. In an embodiment, the substrate 402 is coupled to a rack 404. In an embodiment, the rack 404 is coupled to a power source and a network data source. The substrate 402 is coupled to the rack 404 in a manner to receive power from the power source and to transmit and receive data from a data source. In an embodiment, the first plurality of network contact pins 402i, the first plurality of power contact pins 402j, the second plurality of network contact pins 402k, and/or the second plurality of power contact pins 402l are spring loaded pins. In an embodiment, the first plurality of network contact pins 402i, the first plurality of power contact pins 402j, the second plurality of network contact pins 402k, and/or the second plurality of power contact pins 402l are contact surfaces. In an embodiment, the first plurality of network contact pins 402i and the second plurality of network contact pins 402k are electrically coupled to the network cable 402g. In an embodiment, the first plurality of power contact pins 402j and the second plurality of power contact pins 402l are electrically coupled to the power cable 402h. In an embodiment, the substrate 402 only includes the first plurality of network contact pins 402i and does not include the second plurality of network contact pins 402k. In an embodiment, the substrate 402 only includes the first plurality of power contact pins 402j and does not include the second plurality of power contact pins 402l. In an embodiment, the substrate 402 includes one or more additional pluralities of contact pins or contact surfaces coupled to the rack to receive additional data and/or additional power. In an embodiment, the substrate 402 is a separate physical component from the rack 404. In an embodiment, the substrate 402 is removable from the rack 404.

Referring now to FIGS. 1a, 1b, 2a, 2b, 3a, 3b, 3c, 4, 5a, 5b, 5c, 5d, 5e, 5f, 5g, 5h and 5i, an embodiment of a method 500 for automatically docking an IHS illustrated. In an embodiment, the method 500 begins at step 502 where the IHS 100, illustrated in FIGS. 1a and 1b, and the tray 300, illustrated in FIGS. 3a, 3b and 3c, are provided.

Figure 5A:
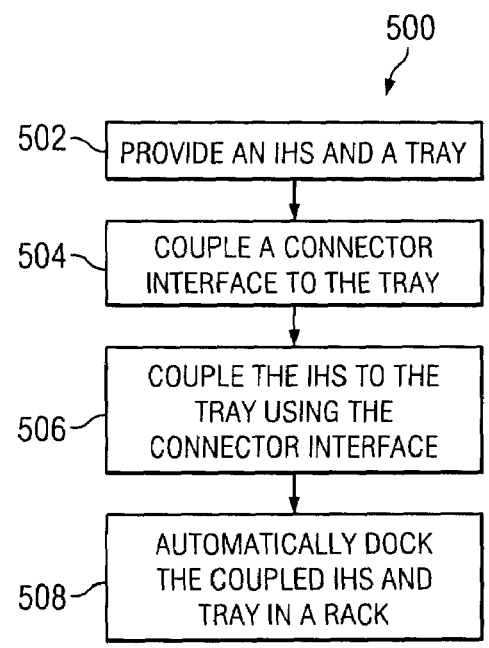
FIG. 5a is a flow chart illustrating an embodiment of a method for docking an IHS.
Figure 5B:
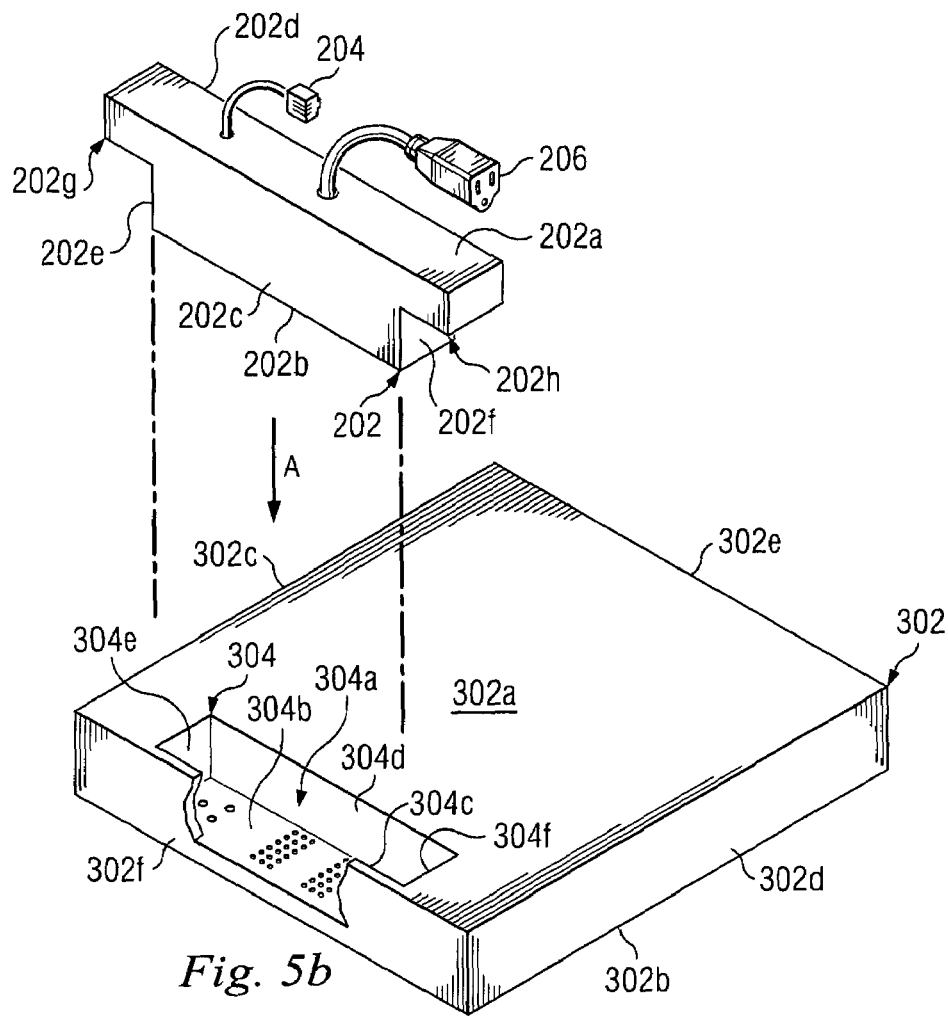
FIG. 5b is a perspective view illustrating an embodiment of the connector interface of FIGS. 2a and 2b being coupled to the tray of FIGS. 3a, 3b and 3c.
Figure 5C:
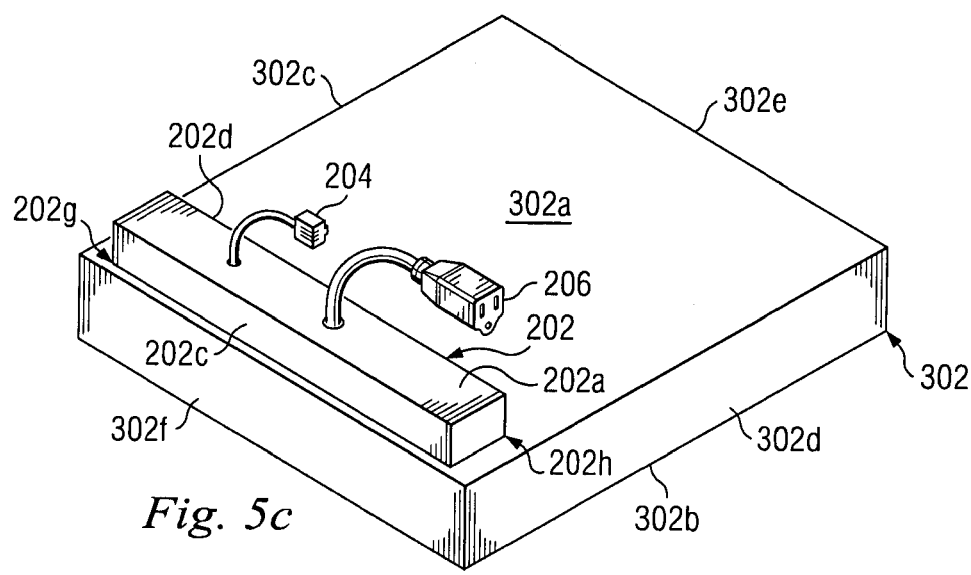
FIG. 5c is a perspective view illustrating an embodiment of the connector interface of FIGS. 2a and 2b coupled to the tray of FIGS. 3a, 3b and 3c.
Figure 5D:
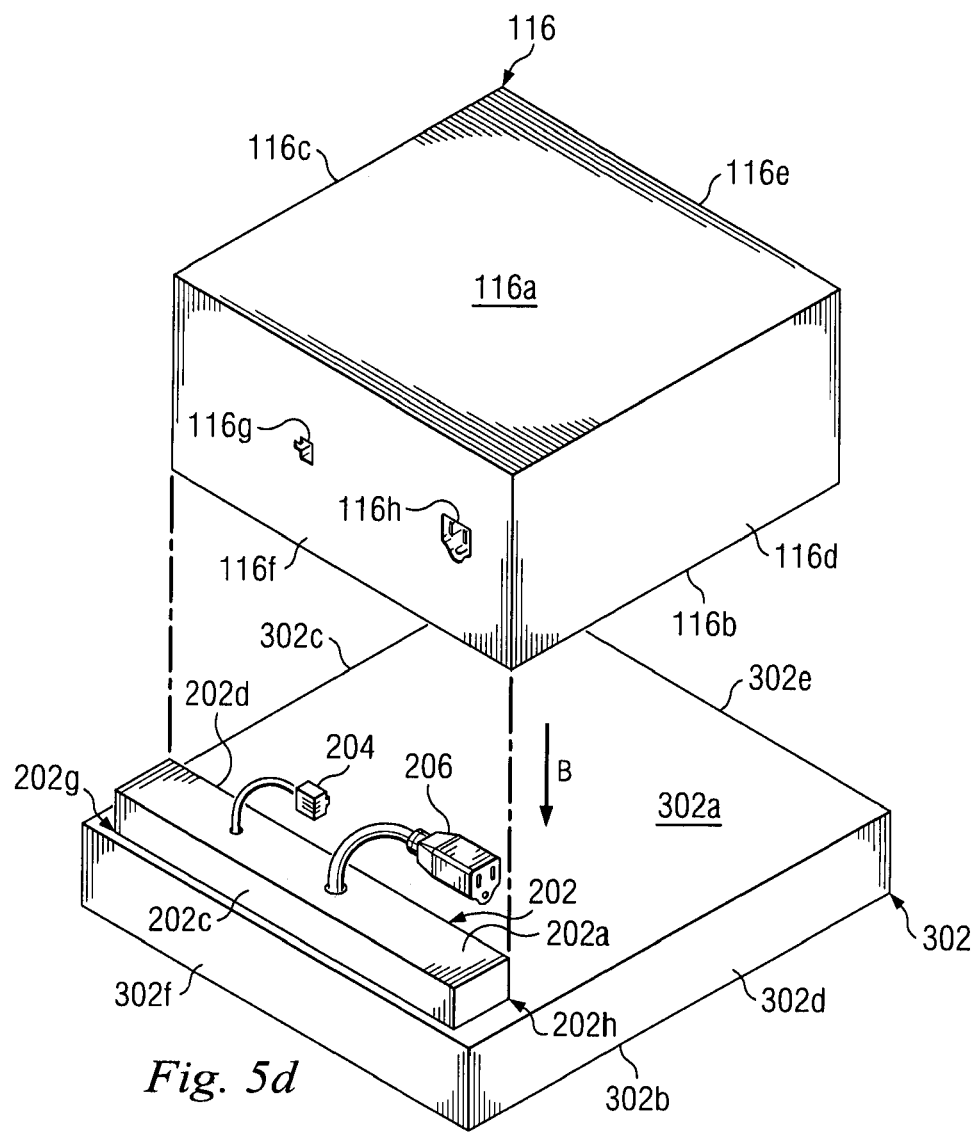
FIG. 5d is a perspective view of an embodiment of the IHS of FIGS. 1a and 1b being coupled to the coupled connector interface and tray of FIG. 5c.
Figure 5E:
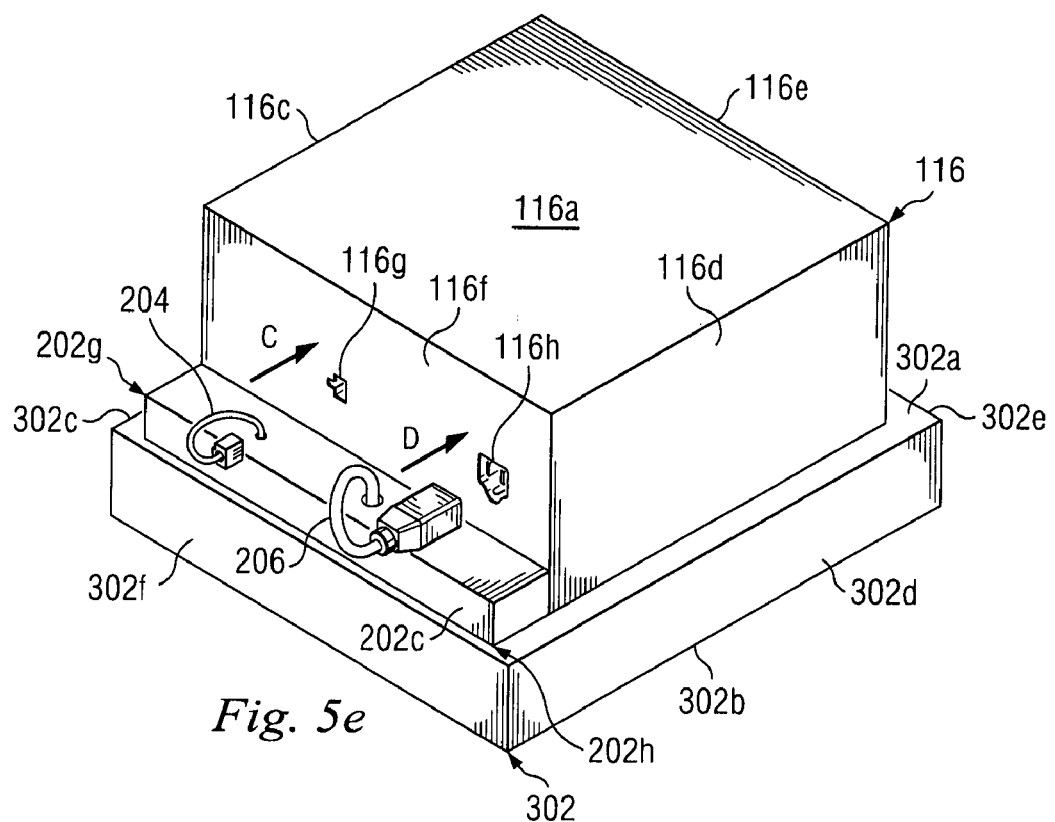
FIG. 5e is a perspective view of an embodiment of the IHS of FIGS. 1a and 1b being coupled to the coupled connector interface and tray of FIG. 5c.
Figure 5F:
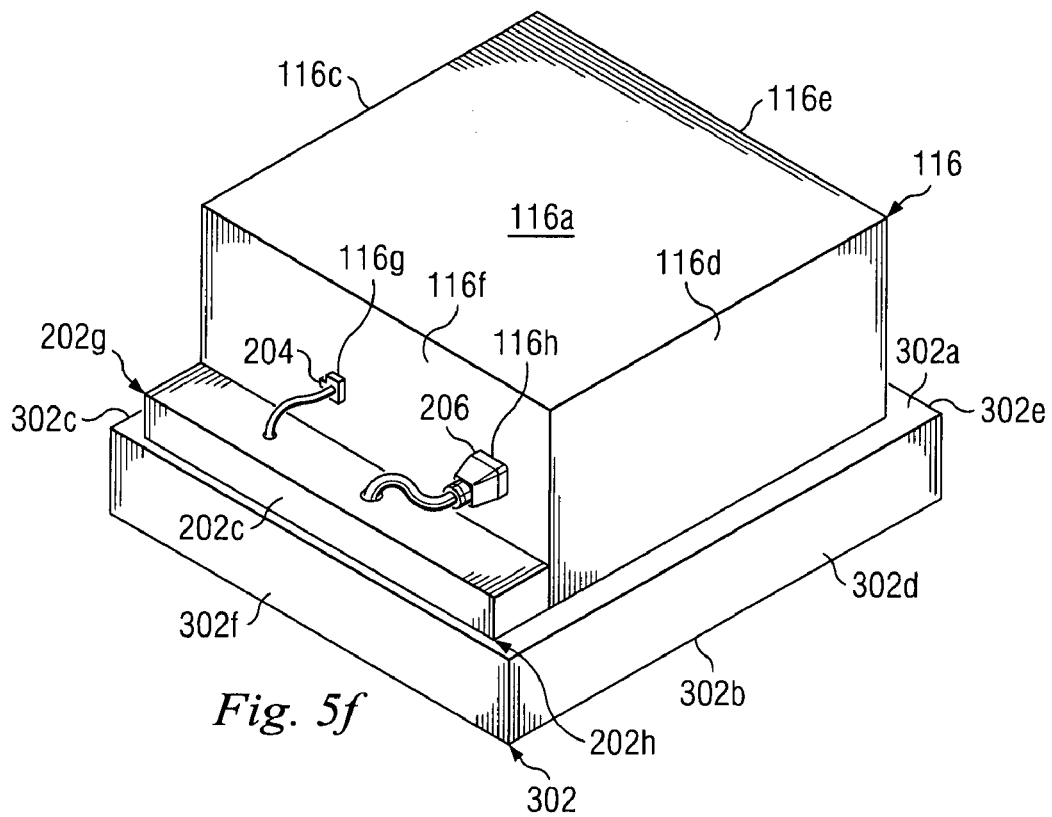
FIG. 5f is a perspective view of an embodiment of the IHS of FIGS. 1a and 1b coupled to the coupled connector interface and tray of FIG. 5c.
Figure 5G:
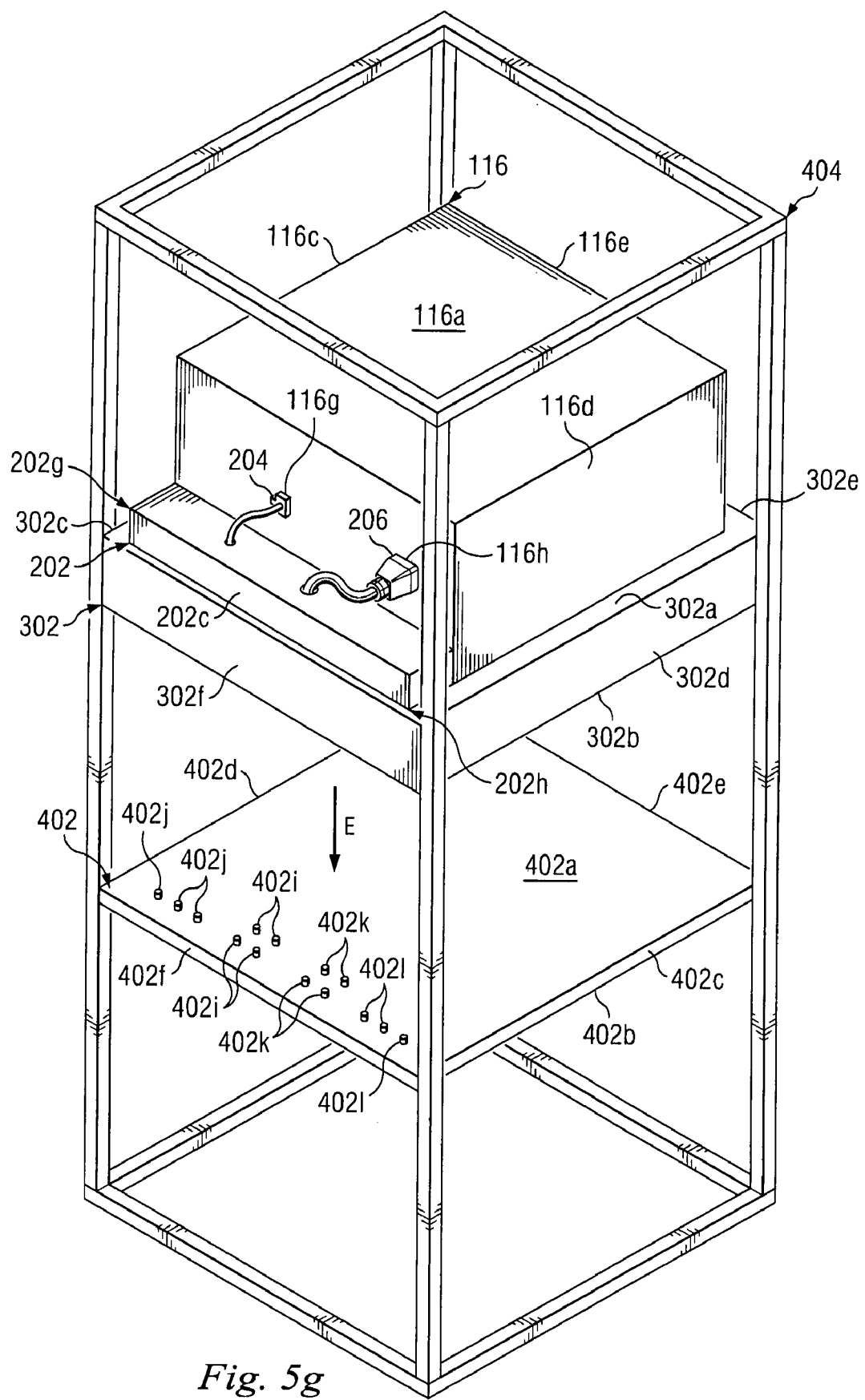
FIG. 5g is a perspective view of an embodiment of the coupled IHS, connector interface, and tray of FIG. 5f being coupled to the docking interface of FIG. 4.
Figure 5H:
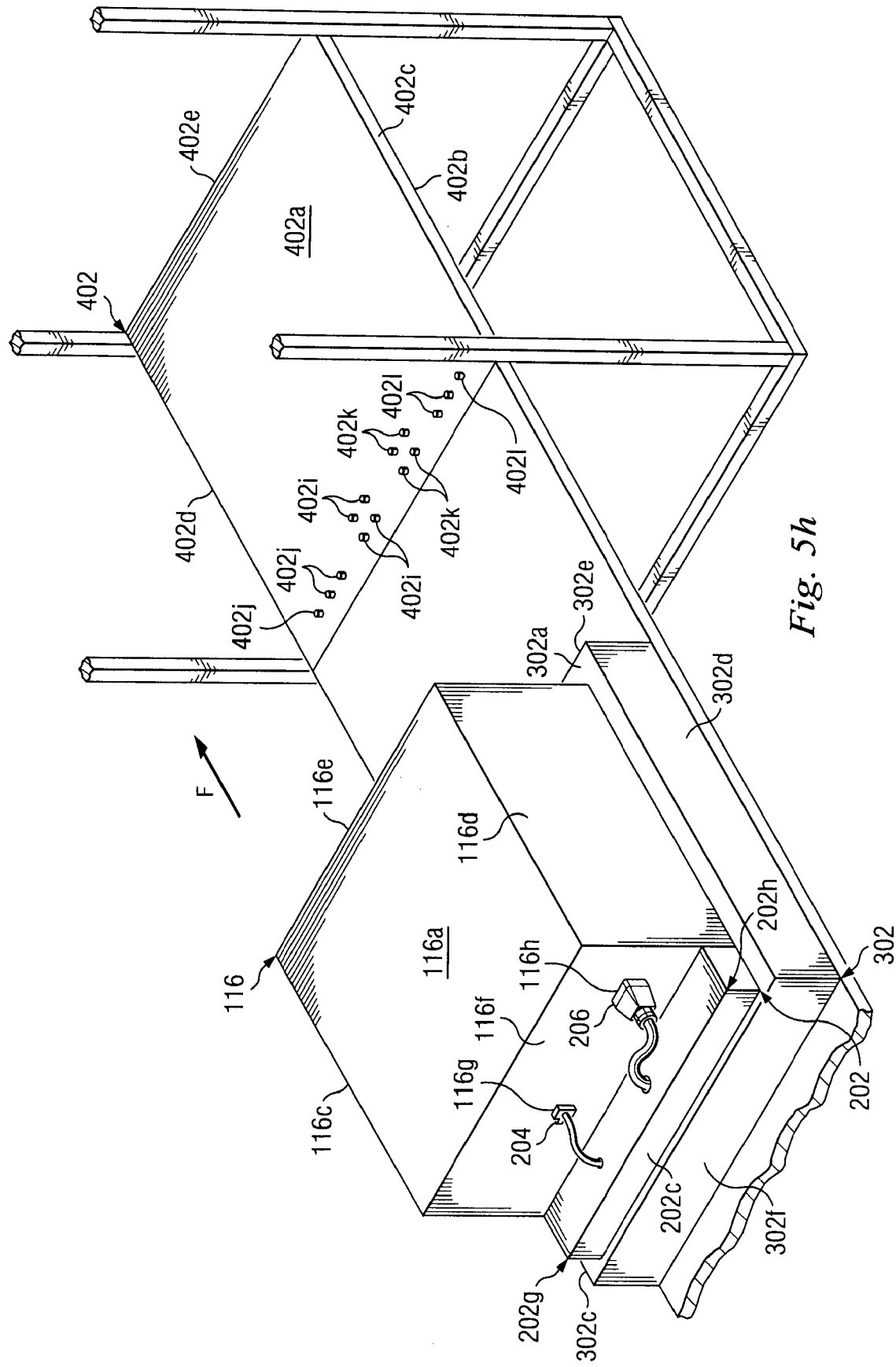
FIG. 5h is a perspective view of an embodiment of the coupled IHS, connector interface, and tray of FIG. 5f being coupled to the docking interface of FIG. 4.
Figure 5I:
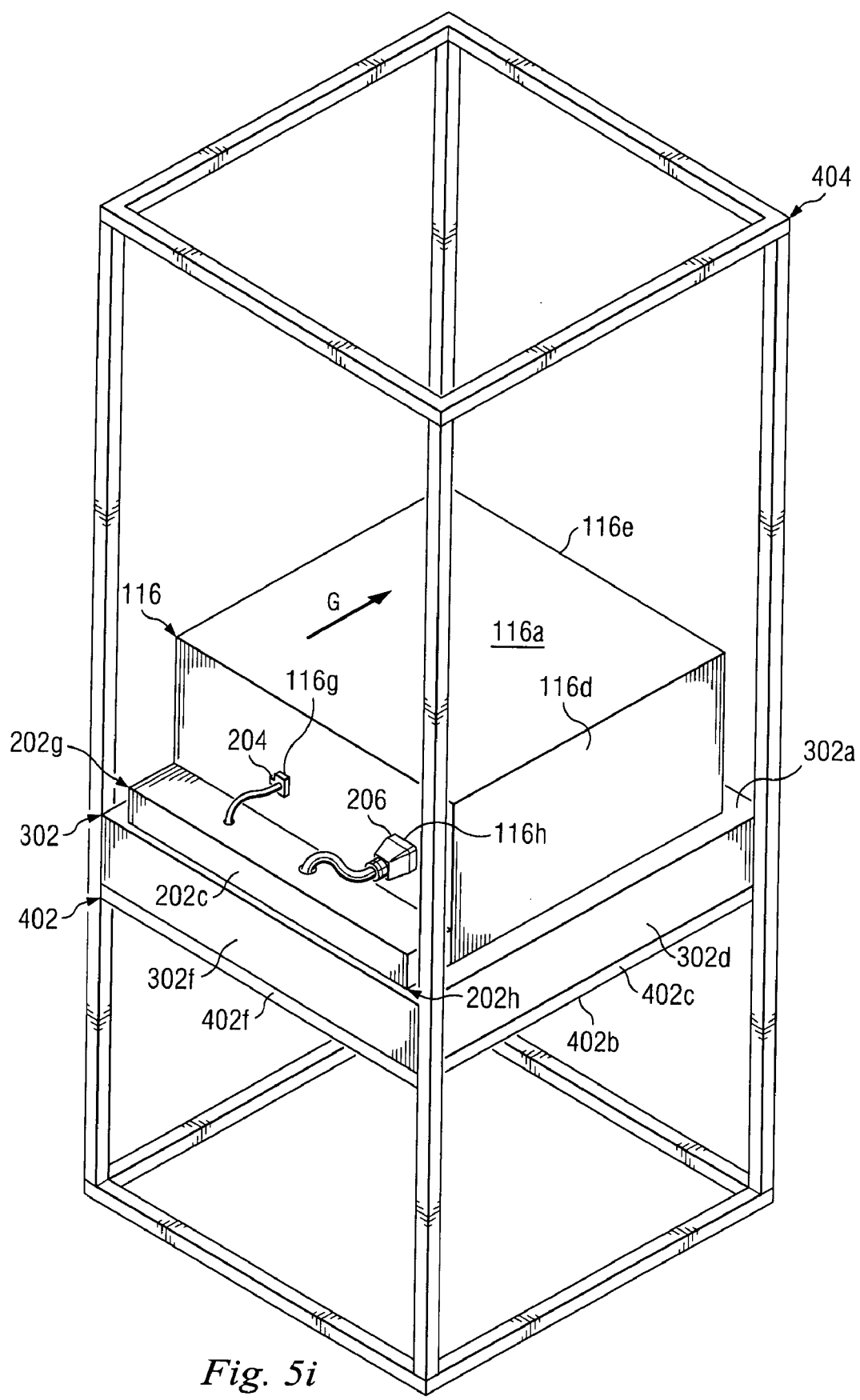
FIG. 5i is a perspective view of an embodiment of the coupled IHS, connector interface, and tray of FIG. 5f coupled to the docking interface of FIG. 4.

In an embodiment, the method 500 then proceeds to step 504 where the connector interface 200, illustrated in FIGS. 2a and 2b, is coupled to the tray 300. In an embodiment, the connector interface 200 is positioned adjacent the tray 300 such that the bottom edge 202b of the substrate 202 is located adjacent the channel 304. In an embodiment, the connector interface 200 is then moved in a direction A such that the substrate 202 enters the channel 304. In the illustrated embodiment, the substrate 202 continues to enter the channel 304 until the first tray coupling member 202g and the second tray coupling member 202h engage the top surface 302a of the tray 300 and the first plurality of power contact pins 210 are electrically coupled to the first plurality of power contacts 308 and the first plurality of network contact pins 208 are electrically coupled to the first plurality of network contacts 306, as illustrated at FIGS. 5b and 5c. In an alternative embodiment, because of the substantially symmetrical design of the connector interface 200 and the channel 304, the connector interface 200 may also be inserted such that the first plurality of power contact pins 210 are electrically coupled to the second plurality of power contacts 312 and the first plurality of network contact pins 208 are electrically coupled to the second plurality of network contacts 310.

In an embodiment, the method 500 then proceeds to step 506 where the IHS 100 is coupled to the tray 200 using the connector interface 200. In an embodiment, the IHS 100 is positioned adjacent the tray 300 such that the bottom surface 116b of the IHS 100 is located adjacent the top surface 302a of the tray 300. In an embodiment, the IHS 100 is then moved in a direction B such that the bottom surface 116b of the IHS 100 engages the top surface 302a of the tray 300 and the IHS 100 is positioned in the tray 300. In an embodiment, the network cable 204 is then moved in a direction C and is inserted into the data port 116g on the side edge 116f of the IHS 100 and the power cable 206 is then moved in a direction D and is inserted into the power port 116h on the side edge 116f of the IHS 100.

Figure 4:
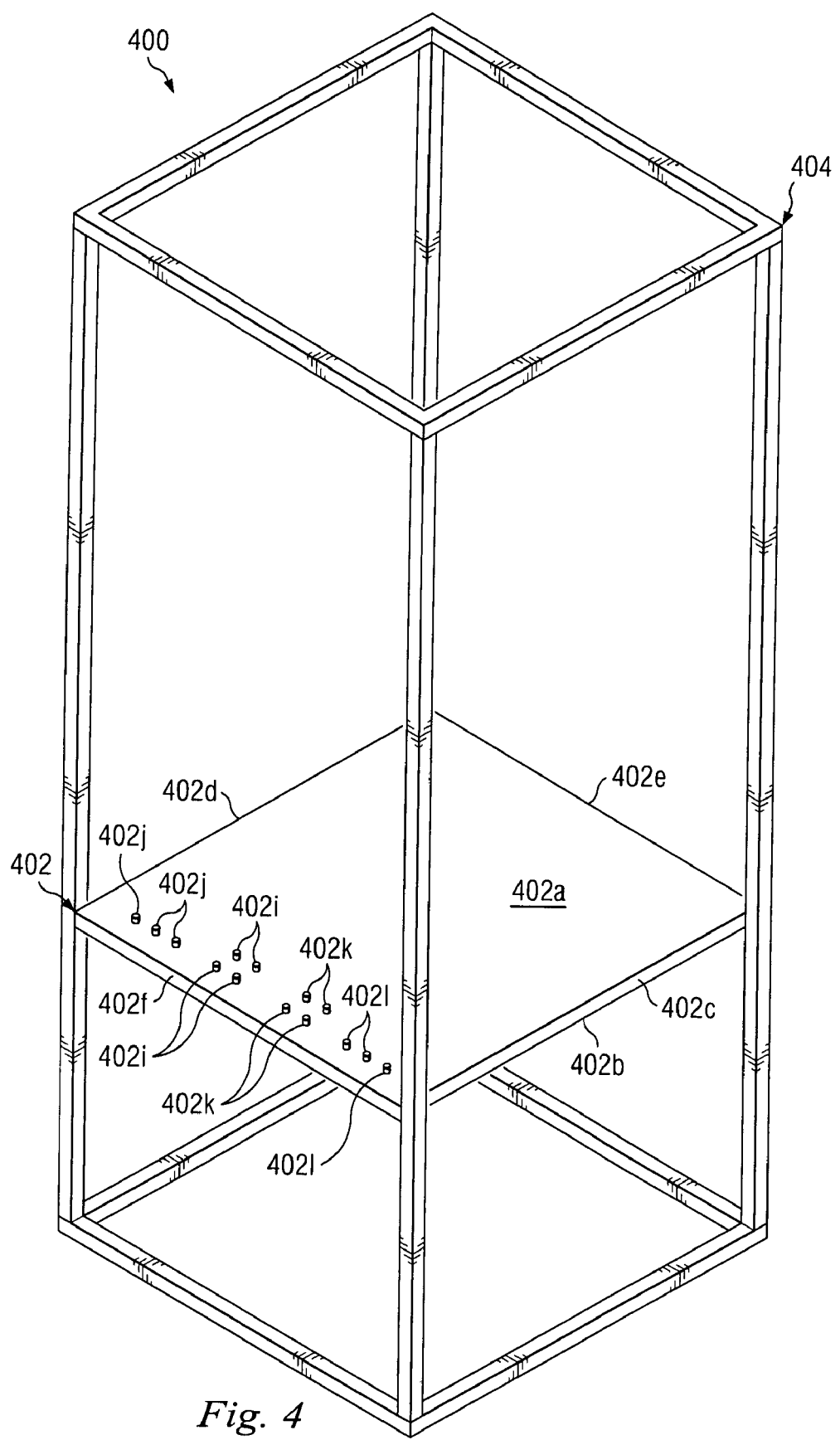
FIG. 4 is a perspective view illustrating an embodiment of a docking interface.

In an embodiment, the method 500 then proceeds to step 508 where the coupled IHS 100 and tray 300 is automatically docked in the rack 404, illustrated in FIG. 4. In an embodiment, automatic docking includes automatically coupling the IHS 100 and tray 300 in the rack 404 such that power and data can be provided to/from the IHS 100 and the rack 404. In an embodiment, additional power and/or data sources can be provided to/from the IHS 100 and the rack 404. For automatic vertical docking, the coupled IHS 100 and tray 300 is positioned such that the bottom surface 302b of the tray 300 is adjacent the top surface 402a of the substrate 402. In an embodiment, the coupled IHS 100 and tray 300 is then moved automatically in a direction E until the bottom surface 302b of the tray 300 engages the top surface 402a of the substrate 402 and the third plurality of network contacts 314 engages the first plurality of network pins 402i, the third plurality of power contacts 316 engages the first plurality of power pins 402j, the fourth plurality of network contacts 318 engages the second plurality of network pins 402k, and the fourth plurality of power contacts 320 engages the second plurality of power pins 402l. For automatic horizontal docking, the coupled IHS 100 and tray 300 is positioned such that the side edge 116e of the IHS 100 is adjacent the top surface 302a near the side edge 402f of the substrate 402 of the docking interface 400. The coupled IHS 100 and tray 300 is then moved automatically in a direction F until the bottom surface 302b of the tray 300 engages the top surface 402a of the substrate 402 and the third plurality of network contacts 314 engages the first plurality of network pins 402i, the third plurality of power contacts 316 engages the first plurality of power pins 402j, the fourth plurality of network contacts 318 engages the second plurality of network pins 402k, and the fourth plurality of power contacts 320 engages the second plurality of power pins 402l.

In an embodiment, once the IHS 100 is docked in the rack 404, the IHS 100 may be automatically decoupled from the rack 404 by a force applied in the direction G. In an embodiment, once the IHS 100 is docked in the rack 404, the rack 404 provides data to the first plurality of network contact pins 402i and/or the second plurality of network contact pins 402i and provides power to the first plurality of power contact pins 402j and/or the second plurality of power contact pins 402l. In an embodiment, the first plurality of network contact pins 402i then transmit data to the third plurality of network contacts 314 and/or the second plurality of contact pins 402*l* then transmit data to the fourth plurality of network contacts 318. In an embodiment, the third plurality of network contacts 314 then transmits data to the first plurality of network contacts 306 and/or the fourth plurality of network contacts 318 then transmits data to the second plurality of network contacts 310. In an embodiment, the first plurality of network contacts 306 then transmits data to the first plurality of network contact pins 208 and/or the second plurality of network contacts 310 then transmits data to the second plurality of network contact pins 212. In an embodiment, the first plurality of network contact pins 208 and/or the second plurality of network contact pins 212 then transmits data to the network cable 204. In an embodiment, the network cable 204 then transmits data to the IHS 100 through port 116*g*. In an embodiment, the network cable 204 receives data from the IHS 100 through port 116 and transmits data to the first plurality of network contact pins 208 and/or the second plurality of network contact pins 212. In an embodiment, the first plurality of network contact pins 208 then transmits data to the first plurality of network contacts 306 and/or the second plurality of network contact pins 212 then transmits data to the second plurality of network contacts 310. In an embodiment, the first plurality of network contacts 306 then transmits data to the third plurality of network contacts 314 and/or the second plurality of network contacts 310 then transmits data to the fourth plurality of network contacts 318. In an embodiment, the third plurality of network contacts 314 then transmits data to the first plurality of network contact pins 402*i* and/or the fourth plurality of network contacts 318 then transmits data to the second plurality of network contact pins 402*k*. In an embodiment, the first plurality of network contact pins 402*i* and/or the second plurality of network contact pins 402*k* then transmit data to the rack 404, and the rack 404 transmits data to the network data source.

In an embodiment, the first plurality of power contact pins 402*j* transmits power to the third plurality of power contacts 316 and/or the second plurality of power contact pins 402*l* transmits power to the fourth plurality of power contacts 320. In an embodiment, the third plurality of power contacts 316 then transmits power to the first plurality of power contacts 308 and/or the fourth plurality of power contacts 320 then transmits power to the second plurality of power contacts 312. In an embodiment, the first plurality of power contacts 308 then transmits power to the first plurality of power contact pins 210 and/or the second plurality of power contacts 310 then transmits power to the second plurality of power contact pins 214. In an embodiment, the first plurality of power contact pins 210 and/or the second plurality of power contact pins 214 then transmit power to the power cable 206. In an embodiment, the power cable 206 then provides power to the IHS 100 using the power port 116*h*. In an embodiment, the rack 404 is a burn rack and once the IHS 100 is docked in the burn rack, software can be downloaded onto the IHS 100 and the IHS 100 can be tested for functionality. Thus, a method is provided where an IHS is docked in a rack without a person having to manually dock the IHS in the rack.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A burn rack docking apparatus for an information handling system (IHS), comprising:
    a substrate;
    a plurality of substrate contacts extending from a surface of the substrate;
    a tray mounted on the substrate and including a first tray surface and a second tray surface;
    a plurality of tray contacts on each of the first and second tray surfaces, the tray contacts on the second tray surface engaging the substrate pins;
    a connector interface mounted on the tray and including a first interface surface and a second interface surface;
    a plurality of interface contacts on each of the first and second interface surfaces, the interface contacts on the second interface surface engaging the tray contacts on the first tray surface, and the interface contacts the first interface surface being attached to cables; and
    an IHS mounted on the tray adjacent the connector interface, the IHS including a plurality of cable connectors attached to the interface contacts of the cables.

2. The apparatus of claim 1, wherein the apparatus is coupled to a burn rack docking interface.

3. The apparatus of claim 1 wherein the tray includes a channel formed therein.

4. The apparatus of claim 2, wherein the apparatus is operable to receive power from a power provider through the burn rack docking interface.

5. The apparatus of claim 2, wherein the apparatus is coupled to the burn rack docking interface using a printed circuit board interface.

6. The apparatus of claim 3 wherein the channel is formed in the first surface.

7. The apparatus of claim 6 wherein the connector interface is seated in the channel.

* * * * *